United States Patent [19]

Ito et al.

[11] Patent Number: 5,059,113
[45] Date of Patent: Oct. 22, 1991

[54] INJECTION MOLDING APPARATUS

[75] Inventors: Michio Ito, Uozu; Hiroshi Yoshida, Kurobe, both of Japan

[73] Assignee: Yoshida Kogyo K. K., Tokyo, Japan

[21] Appl. No.: 505,600

[22] Filed: Apr. 6, 1990

[30] Foreign Application Priority Data

Apr. 7, 1989 [JP] Japan .................................. 1-41506

[51] Int. Cl.$^5$ ............................................. B29C 45/30
[52] U.S. Cl. .................................. 425/564; 264/328.9
[58] Field of Search ........ 425/562, 563, 564, 561–565, 425/566, 594

[56] References Cited

U.S. PATENT DOCUMENTS

| 3,941,540 | 3/1976 | Driscoll | 425/563 |
| 4,043,726 | 8/1977 | Tsunemoto et al. | 425/563 |
| 4,333,608 | 6/1982 | Hendry | 425/563 |
| 4,427,361 | 1/1984 | Saito | 425/563 |

FOREIGN PATENT DOCUMENTS

| 2554501 | 8/1976 | Fed. Rep. of Germany | 425/564 |
| 29832 | 1/1965 | German Democratic Rep. | 425/562 |
| 109468 | 8/1964 | Netherlands | 425/562 |

*Primary Examiner*—Willard E. Hoag
*Attorney, Agent, or Firm*—Hill, Van Santen, Steadman & Simpson

[57] ABSTRACT

An injection assembly for the injection molding of plastics and rubbers is disclosed which is comprised of a cylinder, a nozzle mounted at one end portion of the cylinder, a torpedo fitted at its one end to the nozzle and a plunger arranged to reciprocate in the cylinder. The torpedo has a hollow extension extending opposite to the nozzle and protruding in the cylinder, and the plunger is provided therein with an elongate aperture held in slidably movable relation to the extension of the torpedo. Uniform heating of the molding material is attainable at high speed.

9 Claims, 2 Drawing Sheets

5,059,113

INJECTION MOLDING APPARATUS

BACKGROUND OF THE INVENTION

1. Technical Field

This invention relates to apparatus for the injection molding of plastic and rubbery materials. More particularly, the invention is directed to an injection assembly adapted to be used on such apparatus to thereby convert a molding material from solid particles or pellets into a continuous semi-fluid or fluid mass and to subsequently inject the same into one or more cavities defined in two mating molds.

2. Prior Art

Various apparatus of the character mentioned are known, a typical example of which is built with an upright heating cylinder, a nozzle unit attached to a bottom end of the cylinder, an injection plunger formed to be solid and supported centrally upwardly of the cylinder for up-and-down movement and a feed hopper located to communicate with the cylinder. Fitted centrally of the nozzle unit is a torpedo provided at its exit end with a needle valve. Heaters are arranged both on a peripheral surface of the nozzle unit and within a surrounding wall of the cylinder. A pair of molds are superimposed one on the other, thereby defining a cavity therebetween, and held in cooperative releasable relation to the nozzle unit.

The foregoing apparatus is wholly unsatisfactory as it is feasible only with large heat consumption and even with long molding cycle and often with objectionable material degradation.

Generally, thermoplastic materials for instance of a pellet shape are poor in thermal conductivity and hence requisite of substantial preheat in a spacious region present in the cylinder. The preheated plastics flows through a constricted channel in the torpedo where it gets softened or plasticized with heat for injection into the mold cavity. In such instance the molding material is difficult to preheat with uniformity due primarily to that region in the cylinder being relatively large in cross-sectional area. To be more specific the molding material is subject to heat in a shorter duration at a location contiguous to an inner wall of the cylinder than at that remote from the wall, i.e. in a less uniform manner, and much time is consumptive in preheating the material on the whole.

To cope with those problems it has been proposed that preheating be effected at elevated temperature. However, this will render the plastic material susceptible to overheat on or nearby the inner cylinder wall, eventually leading to inadequate discoloration and even to serious decomposition.

The foregoing situation of the prior art has lent an impetus for the provision of injection assemblies that can work with great reliability in injection-molding plastics and rubbers.

SUMMARY OF THE INVENTION

The present invention seeks to provide a novel injection assembly for use in injection molding apparatus which will enable uniform heating of molding materials at high speed and with utmost simplicity without involving undesirable decomposition, thus ensuring ultimate moldings of superior quality.

The above and other objects and features of the invention will become better understood from the following description upon reading in conjunction with the accompanying drawings.

More specifically, the invention provides an injection assembly for use in injection molding apparatus, which comprises a heating cylinder, a nozzle unit integral with one end portion of the cylinder, a spreader or torpedo snugly fitted at a tapered end thereof to the nozzle unit and having a needle valve secured to a tip end of the tapered end, and an injection plunger reciprocable in the cylinder, the torpedo having a hollow extension extending from the tapered end and protruding into the cylinder, and the plunger being provided therein with an elongate aperture interfitted in slidably movable relation to the extension of the torpedo.

DETAILED DESCRIPTION OF THE INVENTION

Figure 1:
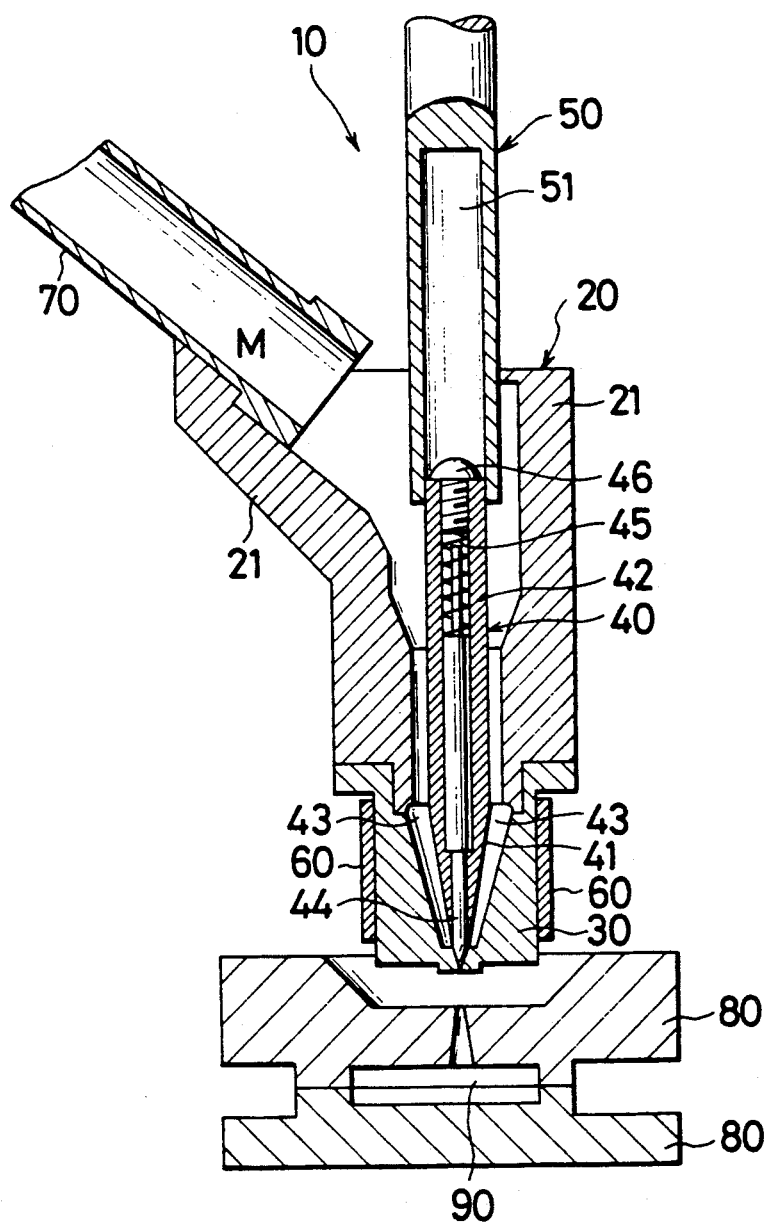
FIG. 1 is a vertical cross-sectional view showing an injection assembly embodying the present invention.

Referring now to the drawings and FIG. 1 in particular, there is shown an injection assembly designated at 10 and constructed in accordance with the present invention. This assembly is designed to suit application to injection molding apparatus in actual use. No explanation will be required with respect to clamping mechanisms and other structural details as commonly accepted in the art.

The injection assembly 10 contemplated under the invention is structured in vertical posture, though not restricted, and comprised essentially of a heating cylinder 20, a nozzle unit 30, a spreader or torpedo 40 and an injection plunger 50. Each such element is configured in a manner to be described.

The cylinder 20 has a body surrounded by a wall 21 of increased thickness and adapted to accommodate a molding material M, i.e. a solid plastics or rubber of a powder or pellet shape. To this end the cylinder body diverges and opens at its one side for entry of the material M. The cylinder 20 acts to preheat or preplasticize the material M.

The nozzle unit 30 is mounted integrally on a bottom end portion of the cylinder 20 and arranged to receive part of the torpedo 40 as will be mentioned.

The torpedo 40 has at its bottom end a tapered portion 41 snugly fitted to the nozzle unit 30 and a hollow extension 42 extending from the tapered portion 41 and protruding into the cylinder 20. A plurality of fins 43, two seen from FIG. 1, are disposed on the tapered portion 41 which are shaped to tightly fit against an inside surface of the nozzle unit 30. A needle valve 44 is attached to a tip end of the tapered portion 41. The torpedo includes a compression spring 45 positioned in the extension 42 and a screw 46 mounted threadedly on a top end opposed to the tapered end. The spring 45 and the screw 46 cooperate with each other in normally urging the valve 44 downwardly toward a delivery direction.

The plunger 50 has an elongate aperture 51 of an inside diameter corresponding to an outside diameter of the extension 42 of the torpedo 40. Thus this plunger reciprocates in sliding interengagement with and over the torpedo.

Heating means 60 is conveniently mounted around the nozzle unit 30. Where it is found desirable, an additional heater may be disposed in conventional fashion within the wall 21 of the cylinder 20.

Designated at 70 is a feed hopper for supplying the molding material M into the cylinder 20. Two separate molds 80 are mated to define therebetween a single cavity 90 into which a soft plastic or rubbery mass is injected by means of the nozzle unit 30.

With the structure specified above, the molding material fed from the hopper is exposed to preheat in the cylinder with the aid of three sources of heat from the cylinder, nozzle and torpedo elements that can all be maintained hot upon switching on of the heater. This constitutes one important feature of the invention from the structure and performance points of view. The plastics or rubber is then softened or plasticized while in passage through the nozzle unit. Downward movement of the plunger allows the soft mass to successively inject through the needle valve into the mold cavity after which a final molding is obtained. It has now been found that a plastics or rubber can be heated with greater uniformity and at higher speed. This is interpreted to mean that moldings of improved quality are provided with shortened molding cycle.

Various changes and alternations may be made to the specific embodiment described above. For instance, a flat type of injection assembly is also possible with minimum modification to the molding apparatus. In this type no needle valve is necessary in the nozzle unit.

Figure 2:
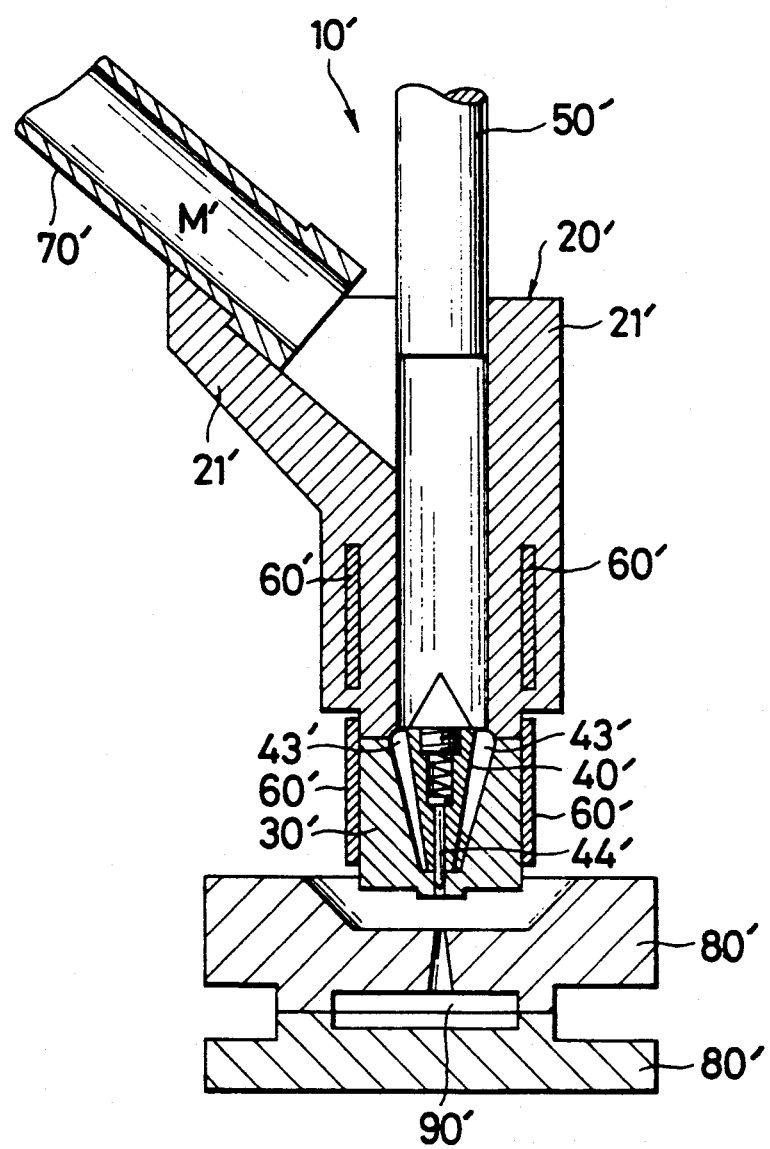
FIG. 2 is a view similar to FIG. 1 but explanatory of an injection assembly of the prior art.

To facilitate comparison a prior injection assembly referred to hereinabove is represented in FIG. 2 in which like and corresponding parts are denoted by like reference numerals primed. This assembly is uncomparable to and different from the assembly of the invention particularly in regard to the torpedo and plunger arrangements.

What is claimed is:

1. An injection assembly for use in injection molding apparatus, which comprises a heating cylinder, a nozzle unit integral with one end portion of said cylinder, a spreader or torpedo snugly fitted at a tapered end thereof to said nozzle unit and having a needle valve secured to a tip end of said tapered end, and an injection plunger reciprocable in said cylinder, said torpedo having a hollow extension extending from said tapered end and protruding into said cylinder, and said plunger being provided therein with an elongate aperture interfitted in slidably movable relation to said extension of said torpedo.

2. An injection assembly according to claim 1, said torpedo having spring means positioned in said extension and screw means mounted on another end thereof opposed to said tapered end, said spring and screw means cooperatively urging said valve normally toward a delivery direction.

3. An injection assembly according to claim 1 being of an upright formation.

4. An injection assembly for use in injection molding apparatus, which comprises a heating cylinder, a nozzle unit integral with one end portion of said cylinder, a torpedo snugly fitted at a tapered end thereof to said nozzle unit, and an injection plunger reciprocal in said cylinder, said torpedo having a hollow extension extending from said tapered end and protruding into said cylinder, and said plunger being provided therein with an elongate aperture, said extension of said torpedo interfitted into said aperture, providing for said extension to be slidably movable with respect to said plunger.

5. An injection assembly according to claim 4, wherein said nozzle unit and said cylinder are aligned horizontally.

6. An injection assembly for use in injecting molding apparatus, comprising:
 a heating cylinder;
 a nozzle unit integral with one end portion of said heating cylinder and having a discharge opening;
 a torpedo snugly fitted at a tapered end thereof to said nozzle unit, said torpedo having a hallow extension extending from said tapered end and protruding into said cylinder;
 an injection plunger reciprocal in said cylinder; and
 said plunger being provided therein with an axial channel wherein said extension of said torpedo is arranged to be protrudable into said channel in slidably movable relationship.

7. An injection assembly according to claim 6, wherein said torpedo further comprises a needle valve secured to a tip end of said tapered end, said needle valve spring loaded to close said discharge opening of said nozzle unit.

8. An injection assembly according to claim 6, wherein said assembly comprising a heating element surrounding said nozzle unit.

9. An injection assembly according to claim 6, wherein plunger comprises a hollow cylinder telescopically overfitting said hollow extension and tightly fittable between an outside of said hollow extension and an inside of said heating cylinder.

* * * * *